United States Patent Office 3,287,802
Patented Nov. 29, 1966

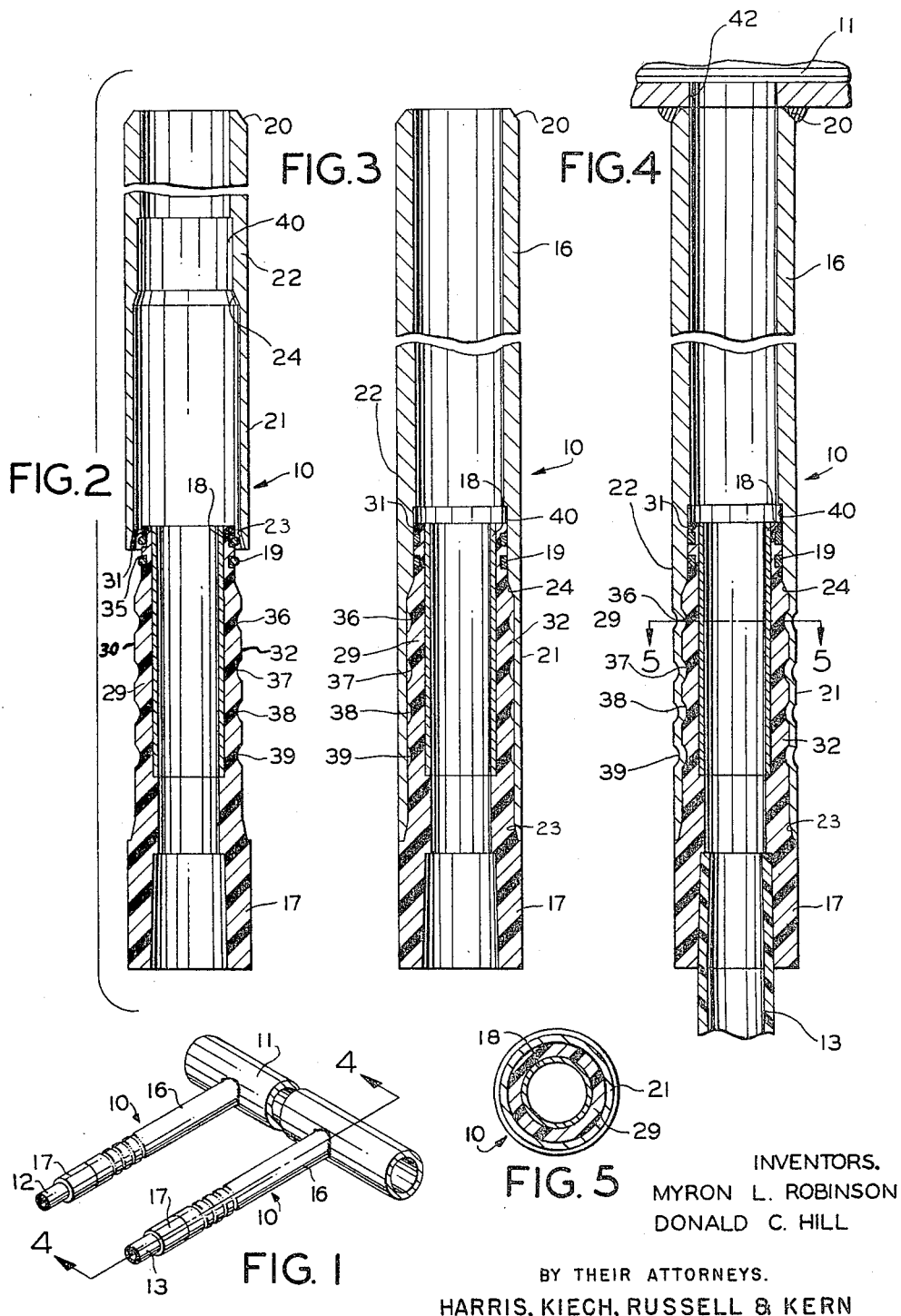

3,287,802
METHOD FOR COUPLING A PLASTIC PIPE TO A METAL PIPE
Myron L. Robinson, 419 de la Fuente St., Monterey Park, Calif., and Donald C. Hill, 998 Glen Oaks, Pasadena, Calif.
Original application July 26, 1961, Ser. No. 126,911, now Patent No. 3,222,094, dated Dec. 7, 1965. Divided and this application July 26, 1965, Ser. No. 474,930
5 Claims. (Cl. 29—508)

This application is a division of our copending application Serial No. 126,911, filed July 26, 1961, now Patent No. 3,222,094.

This invention relates to couplings for metal and plastic pipe and in particular, to a new and improved coupling that can be manufactured, assembled and tested in the factory and installed in the field without disturbing the coupling.

The coupling of the present invention is particularly adapted for gas distribution systems where the street mains are relatively large diameter steel pipe and the feeders to the houses have always been small diameter steel pipe. It would be very convenient to use flexible plastic pipe for the feeders from the street mains to the houses and within the houses. Suitable plastic pipe has been available for some time; however, its use has been retarded by the problems encountered in providing usable joints and couplings between the metal pipe and the plastic pipe.

Yet another object of the invention is to provide an improved method for forming a fluid tight seal between a plastic tube and a metal tube useful in transmitting fluids at high pressure.

In accordance with another embodiment of this invention, there is provided a process for forming a plastic pipe to metal pipe coupling which comprises the steps of inserting an end portion of a plastic pipe into an end portion of a metal pipe wherein the plastic pipe end portion is provided with irregularities of contour on its outer peripheral surface and applying radial pressure to the outer peripheral surface of said metal pipe overlying said irregularities of contour so as to deform said metal pipe into interlocking, complementary, abutting alignment with said irregularities of contour.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

FIG. 1 is a perspective view showing the coupling of the invention in use with a main and two feeders;

FIG. 2 is an enlarged sectional view showing the coupling prior to assembly;

FIG. 3 is a view similar to that of FIG 2 showing the assembled parts prior to swaging;

FIG. 4 is a view similar to that of FIG. 3 showing the completed coupling as installed; and FIG. 5 is a sectional view taken along the line 5—5 of FIG. 4.

In FIG. 1, two plastic to metal couplings 10 provide for fluid flow from a main conduit 11 to feeder conduits 12 and 13, respectively, the main conduit being a steel pipeline and the feeder conduits being flexible plastic hose. The components of the coupling 10 are shown prior to assembly in FIG. 2 and include a length of metal pipe 16, a length of plastic pipe 30, a metal sleeve 18 and two seal gaskets one of which is identified by reference numeral 19.

The metal pipe may be any convenient length, such as about twelve inches and preferably has a chamfer 20 at one end to facilitate welding and is adapted at the other end to receive a portion of the plastic pipe 30. The pipe 16 may be conventional steel pipe and its minimum length is selected to provide thermal insulation for the plastic pipe at one end during the welding operation at the other end. The metal pipe preferably has a thick-wall zone 22 which terminates at one end in thin-wall zone 21. The thick-wall zone 22 may correspond to the wall of the pipe as originally manufactured. However, it is preferred to make a slight counterbore 40 in the thick-wall zone adjacent the thin-wall zone so as to provide a smooth surface for the seal gasket. Tapered transition zones 23 and 24 are ordinarily provided at the end of the pipe and between the thin-wall and thick-wall zones, respectively, to facilitate manufacturing and assembly. The matching tapers illustrated at reference numeral 23 in FIG. 4 are advantageous to the extent that notch effect and shear stress are minimized under conditions imparting radial or axial forces to the coupling.

The plastic pipe 30 has one end portion 29 that is a telescoping sliding fit into the metal pipe 16 and another end portion 17 that is adapted to receive the plastic feeder 13. The end portion 29 preferably includes an end section 31 that slidingly fits into the thick-wall zone 22 and an intermediate section 32 that slidingly fits into the thin-wall zone 21, as seen in FIG. 3. The plastic pipe 30 may be made of any suitable plastic such as a cellulose acetate butyrate or a polyvinyl chloride.

A fluid seal is positioned between the outer periphery of the end section 31 of the plastic pipe 30 and the inner periphery of the thick-wall zone 22 of the metal pipe 16. The fluid seal advantageously takes the form of an annular groove 35 in the end section 31 of the plastic pipe and a seal gasket 19 disposed therein. The seal gasket, which may be a conventional O-ring seal, is in sealing engagement with the inner periphery of the thick-wall zone of the metal pipe. Although in a preferred embodiment of the invention, two sealing units, each comprising groove and gasket are employed, it is apparent, of course, that a single sealing unit can be advantageously used in the structure of the invention or three or more sealing units can be beneficially employed in the coupling. If multiple sealing units are employed, each seal gasket may be fabricated from the same or different material. Suitable gasket materials include nitrile rubber, polymerized chloroprene and silicone rubber.

A plurality of annular grooves, four in the preferred embodiment illustrated herein 36, 37, 38, 39, is provided in the intermediate section 32. The grooves 36–39 have rounded bottoms and, while they may be of equal depth, the groove 36 nearest the end section 31 is preferably the deepest, with the depth decreasing as a function of distance of the groove from the end section 31.

The sleeve 18 is telescopingly fitted within the end portion 29 of the length of plastic pipe 30 and serves as a stiffener for the plastic pipe. The sleeve is preferably fabricated from steel but may be made of other material such as aluminum or copper.

After the components are assembled as shown in FIG. 3, the thin-wall zone 21 of the metal pipe is compressed around the plastic pipe (for example, by swaging) to provide a mechanical grip between the pipes with the maximum grip being obtained at the deepest groove 36 and maximum resistance to shear stress being obtain at the shallowest groove 39. The swaging operation may be performed with any suitable tool but a thread roller is preferred. The thread roller applies pressure along the entire length of the thin-wall zone at one time resulting in a more uniform mechanical engagement between the pipes. The metal pipe is preferably deformed into the grooves of the plastic pipe as shown in FIG. 4 by machine rolling technique with the maximum deformation occurring at the groove 36. The deformation of the metal into the grooves of the plastic pipe serves to absorb end thrust such that the coupling will not become disengaged under use conditions. The sleeve 18 may be slightly deformed during the swaging operation but is preferably made sufficiently rigid to maintain its original shape.

It should be noted that the seal gasket 19 is positioned to engage the thick-wall zone of the metal pipe thus making the sealing engagement between the metal and plastic pipes independent of the mechanical engagement therebetween. The seal gasket is carried in a portion of the plastic pipe that has relatively very thin wall sections so that dimensional changes occurring in the plastic during fabrication and subsequent use will not affect the seal, the seal position being controlled primarily by the sleeve 18 and the metal pipe 16.

The swaging operation is performed at the factory where the components are made and the coupling may then be tested for leaks. One form of the invention presently in production is tested at 10.0 p.s.i. and couplings have been satisfactorily tested at pressures in excess of 100 p.s.i. The coupling may also be coated at the factory with any desired surface protecting material. This factory application results in a more uniform and less expensive means of protection.

The completed coupling is then ready for installation in the field to provide an assembly such as is shown in FIG. 1. Referring to FIG. 4, the end of the metal pipe 16 having the chamfer 20 is positioned at an opening 42 in the pipe 11 and is welded thereto. Of course, this end of the metal pipe may be provided with any other suitable metal-to-metal coupling means. The plastic hose or pipe 13 is inserted into the end portion 17 of the plastic pipe 30 and is cemented in place by a suitable plastic cement. Alternatively, for higher capacity lines, a piece of plastic hose may be positioned over the end portion 17 of the pipe 30 and cemented thereto. For example, in a production design of the invention utilizing three-quarter inch steel pipe for the element 16, five-eighths inch O.D. plastic tubing may be inserted into the component 17 or one inch O.D. plastic tubing may be positioned over the component 17. While the plastic-to-plastic joints provided by present day plastic cements are quite strong, it has been established by tests on the plastic to metal coupling of the invention that the pullout strength of the plastic to metal coupling is greater than that of the plastic-to-plastic coupling.

The plastic to metal coupling of the invention provides for field installation of plastic to metal joints while being assured of leakproof couplings. The plastic to metal coupling itself is not stressed during the installation in the field, the welding and cementing occurring at the ends of the coupling remote from the joint itself. The uniform, small outside diameter of the coupling is easily taped or otherwise covered by protective material after installation. Also, a length of large diameter pipe can be slid over this coupling to provide mechanical protection against digging tools and the like when the installation will be buried a short distance below the ground surface.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

What is claimed is:

1. In a method for coupling a plastic pipe to a metal pipe wherein an end portion of said plastic pipe includes an intermediate section terminating in an end section with the intermediate section provided with external annular locking grooves and the end section provided with at least one fluid sealing unit with said sealing unit including an annular sealing groove in the outer peripheral surface of said end section and a seal gasket positioned therein and adapted to engage the inner peripheral surface of the metal pipe, the steps of:
    inserting said plastic pipe end portion into an end portion of said metal pipe; and
    applying radial pressure to the outer peripheral surface of said metal pipe overlying said locking grooves so as to deform said metal pipe into and about said locking grooves in complementary, interlocking, abutting alignment.

2. In a method for coupling a plastic pipe to a metal pipe wherein an end portion of said plastic pipe includes an intermediate section terminating in an end section with the intermediate section provided with external annular locking grooves with the depth of said locking grooves decreasing as a function of distance of the locking groove from said end section and the end section provided with at least one fluid sealing unit with said sealing unit including an annular sealing groove in the outer peripheral surface of said end section and a seal gasket positioned therein and adapted to engage the inner peripheral surface of the metal pipe in fluid sealing relationship, the steps of:
    inserting said plastic pipe end portion into an end portion of said metal pipe; and
    applying radial pressure to the outer peripheral surface of said metal pipe overlying said locking grooves so as to deform said metal pipe into and about said locking grooves in complementary, interlocking, abutting alignment.

3. A method for forming a plastic pipe to metal pipe coupling which comprises:
    forming a plastic pipe having an end portion including an intermediate section terminating at one end in an end section;
    forming external annular locking grooves on the outer peripheral surface of said intermediate section with the depth of said locking grooves decreasing as a function of distance of the locking groove from said end section;
    forming at least one fluid sealing unit at said end section, said sealing unit comprising an annular sealing groove in the outer peripheral surface of said end section and a seal gasket positioned therein and adapted to engage the inner peripheral surface of the metal pipe in fluid sealing relationship;
    forming a diverging taper on the outer peripheral surface of said plastic pipe at the other end of said intermediate section;
    inserting a metal sleeve in said plastic pipe in circumferential abutment to said intermediate and end sections;
    forming a metal pipe with a thick-wall zone terminating in the direction of the orifice in a thin-wall zone with the thin-wall zone terminating at the orifice in a diverging taper;
    telescopingly inserting said plastic pipe end portion into an end portion of said metal pipe with said end section in alignment with said thick-wall zone, said intermediate section in alignment with said thin-wall zone and the tapers of said pipes in complementary, abutting alignment; and
    applying radial pressure to the outer peripheral surface of said metal pipe overlying said locking grooves so as to deform said metal pipe into and about said locking grooves in complementary, interlocking, abutting alignment.

4. In a method for coupling a plastic pipe to a metal pipe wherein an end portion of said plastic pipe includes an intermediate section terminating in an end section with the intermediate section provided with at least one external annular locking groove and the end section provided with at least one fluid sealing unit with said sealing unit including an annular sealing groove in the outer peripheral surface of said end section and a seal gasket positioned therein and adapted to engage the inner peripheral surface of the metal pipe, the steps of:

inserting said plastic pipe end portion into an end portion of said metal pipe; and applying radial pressure to the outer peripheral surface of said metal pipe overlying said locking groove so as to deform said metal pipe into and about said locking groove in complementary, interlocking, abutting alignment.

5. In a method for coupling a plastic pipe to a metal pipe wherein an end portion of said plastic pipe includes an intermediate section terminating in an end section with the intermediate section provided with at least one external annular locking groove and the end section provided with at least one fluid sealing unit with said sealing unit including an annular sealing groove in the outer peripheral surface of said end section and a seal gasket positioned therein and adapted to engage the inner peripheral surface of the metal pipe, the steps of:

stiffening said end portion of said plastic pipe by inserting a substantially rigid sleeve therein;

inserting said plastic pipe end portion into an end portion of said metal pipe; and applying radial pressure to the outer peripheral surface of said metal pipe overlying said locking groove so as to deform said metal pipe into and about said groove in complementary, interlocking, abutting alignment without substantially deforming said plastic pipe.

References Cited by the Examiner

UNITED STATES PATENTS

| | | | |
|---|---|---|---|
| 2,069,141 | 1/1937 | Furlong | 285—256 X |
| 2,073,909 | 3/1937 | Stecher | 29—508 |
| 2,211,622 | 8/1940 | Hunziker | 285—256 X |
| 2,487,512 | 11/1949 | Berger. | |
| 2,813,664 | 11/1957 | Punte | 29—510 X |
| 3,017,203 | 1/1962 | Macleod | 285—256 |

CHARLIE T. MOON, *Primary Examiner.*